(12) United States Patent
Josefsson et al.

(10) Patent No.: US 6,754,237 B1
(45) Date of Patent: Jun. 22, 2004

(54) ISDN CALL PROCESSING

(75) Inventors: Per Josefsson, Älvsjö (SE); Carina Lind, Mountain View, CA (US); Staffan Sjödin, Tyresö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 594 days.

(21) Appl. No.: 09/698,868

(22) Filed: Oct. 27, 2000

Related U.S. Application Data

(63) Continuation of application No. PCT/SE99/00646, filed on Apr. 22, 1999.

(30) Foreign Application Priority Data

Apr. 28, 1998 (SE) .............................................. 9801477

(51) Int. Cl.[7] .............................. H04J 3/12; H04J 3/16; H04J 12/66
(52) U.S. Cl. ........................ 370/524; 370/465; 370/352; 707/104.1
(58) Field of Search ................................. 320/524–526, 320/463–465, 466, 385, 351–352; 707/104.1

(56) References Cited

U.S. PATENT DOCUMENTS

| 5,388,258 A | * | 2/1995 | Larsson et al. .......... 707/104.1 |
| 5,420,867 A | | 5/1995 | Price et al. |
| 5,602,840 A | * | 2/1997 | Gunther et al. ............. 370/385 |
| 5,721,729 A | * | 2/1998 | Klingman ................... 370/524 |
| 5,864,559 A | * | 1/1999 | Jou et al. ..................... 370/465 |

OTHER PUBLICATIONS

Bocking, Stefan, "Object–Oriented Network Protocols", INFOCOM'97, vol. 13, Apr., 1997, p. 1245– p. 1252.

* cited by examiner

*Primary Examiner*—Steven H. D Nguyen

(57) ABSTRACT

Method and apparatus for setting up a connection between a first terminal and a second terminal over an Integrated Services Digital Network (ISDN) link having one or more bearer channels that allow a user-selected protocol are provided. The terminals support a plurality of possible software protocols for use on the bearer channels. In order to facilitate new types of ISDN protocols on an existing system, the method includes the step of separating the protocol software into a generic module containing generic ISDN encoding/decoding protocols and into protocol specific modules containing specific types of ISDN encoding/decoding protocols.

7 Claims, 3 Drawing Sheets

ISDN CALL PROCESSING

This application is a continuation of international application No. PCT/SE99/00646, filed on Apr. 22, 1999.

BACKGROUND

The present invention relates to a method of setting up a connection between a first terminal and a second terminal over an Integrated Services Digital Network (ISDN) link providing one or more bearer channels that allow a user-selected protocol, the terminals supporting a plurality of possible software protocols for use on said bearer channels. The invention also relates to an application resource system for setting up a connection between a first terminal and a second terminal over an ISDN line.

When a connection is to be set up between two terminals, over an Integrated Services Digital Network (ISDN) link providing one or more bearer channels that allow a user-selected protocol, a Call Setup message is being sent from a first Application Resource System to a second Application Resource System. It is a problem that different types of ISDN protocols can be used in different parts of the system. There is a general protocol according to CCITT q931, which is the base for the ISDN protocol family. Other ISDN protocols that can be used such as DSS1, ISDN S2 and AT&T 5ESS, are modifications of the general ISDN protocol q931.

Making adoption to a new type of ISDN protocol on an existing system is a costly procedure which takes a lot of man-hours to achieve. The software units involved are normally very complex and tricky to work with.

SUMMARY

What is needed is therefore a software system structure that supports fast and easy implementation of different ISDN protocols to achieve low development cost.

This object is solved by the method in accordance with the invention, wherein the protocol software is separated into a generic module containing generic ISDN encoding/decoding protocols and into protocol specific modules containing specific types of ISDN encoding/decoding protocols.

Preferably, the connection link is set up via an Application Resource System ARE comprising a physical link handler PLH for handling messages to and from related hardware, a signal channel handler SCH for interfacing with protocol drivers and a call supporting protocol handler PH.

In a particular embodiment of the method in accordance with the invention, the signal channel handler calls the different ISDN modules that are needed, during the encoding/decoding procedure.

Preferably, the signal channel handler SCH is provided with the generic module and the protocol specific modules, and information on the actual ISDN protocol being used during configuration of the system is stored in the SCH.

Preferably, a check is made if all information elements in a time slot has been received and that the received elements are not distorted, and a message is sent to the protocol handler PH regarding set up information together with error information.

The Application Resource System according to the invention is characterized in that it includes a signal channel handler SCH for interfacing with protocol drivers and being provided with a software structure which separates the protocol software into a generic module containing generic ISDN encoding/decoding protocols and into a protocol specific module containing specific types of ISDN encoding/decoding protocols.

Preferably, the Application Resource System also includes a physical link handler PLH for handling messages to and from related hardware and a call supporting protocol handler PH.

In an advantageous embodiment of the Application Resource System, the protocol handler PH houses a state machine, and that it is provided with software which is structured in one module covering basic calls as an user side, PH-user, one module covering basic calls as a net side, PH-net, and an additional module for each type of ISDN protocol.

The Application Resource System preferably comprises a mobility server for setting up cordless connection via radio exchange between the first terminal and the second terminal.

BRIEF DESCRIPTION OF THE DRAWINGS

The invention will in the following be further described in a non-limiting way with reference to the accompanying drawings in which.

DETAILED DESCRIPTION

The invention will be described in relation to a mobile telephone system, but the invention may also be adapted to other types of telephone systems.

Figure 1:
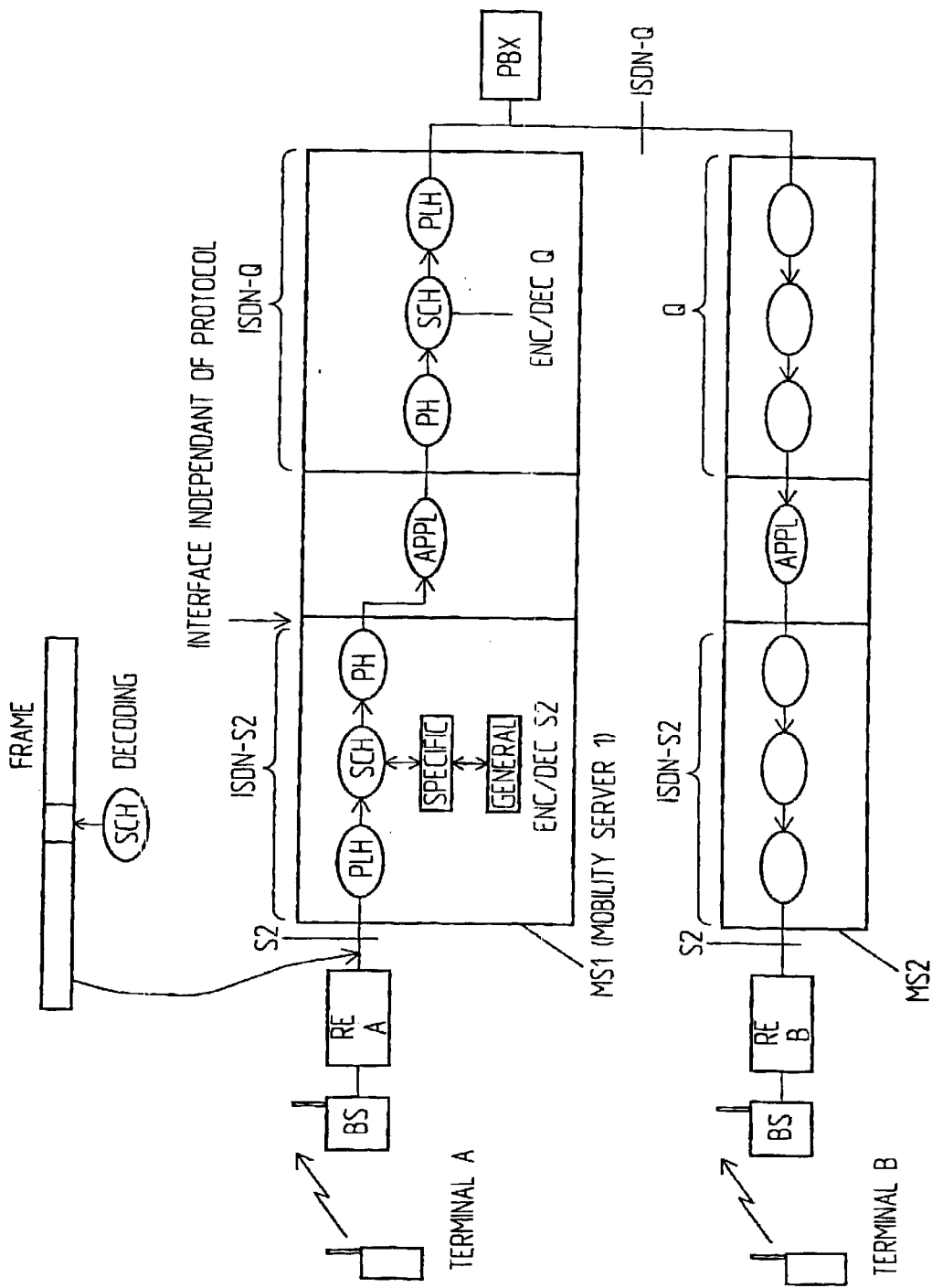
FIG. 1 schematically illustrates setting up a cordless connection via terminal A and terminal B.

FIG. 1 illustrates setting up a connection between cordless terminal A and cordless terminal B. Then a call setup message is being sent from Radio Exchange A to Radio Exchange B via a first Application Resource System and a second Application Resource System. In this embodiment of the invention, each Application Resource System comprises a Mobility Server, in this case MS1 and MS2.

A frame of speech and signaling information is being sent from radio exchange A to the first Mobility Server MS1 which is provided with a Physical Link Handler PLH, a Signal Channel Handler and a Protocol Handler PH. The Signal Channel Handler SCH is decoding a signaling message in the signalling channel and during the decoding procedure the SCH is calling the different ISDN modules that are needed. In SCH is stored information on the actual ISDN protocol being used, in this case ISDN S2. This is being done during configuration of the actual system.

During Call Setup, the following action is being done in SCH and the connected modules. A check is made to see if all information elements in the signalling channel have been received and that the received, elements are not distorted. When the check has been finished, a message is being sent to the Protocol Handler PH. The message includes Set up information together with error information. The Protocol Handler PH analyzes the message, administers Layer 3 error handling and supports the call states.

The PLH has the following functions: It handles messages to and from the hardware. It maintains the link activity with reference to Level 2 messages. It receives and reports alarms. It passes Level 3 messages to SCH, and it receives Level 3 messages from SCH and sends them to hardware.

The SCH has the following functions: It handles functions for Call references. It handles Channel selection, and it interfaces with the encoding and decoding drivers.

The PH functions as a state machine for ISDN calls.

The SCH drivers are for example divided into the following modules:

| | |
|---|---|
| q931_dec | Common module for decoding information elements |
| q931_enc | Common module for encoding information elements |
| isdn_q_dec | additional module for decoding isdn-q-specific elements |
| isdn_q_enc | additional module for encoding isdn-q-specific elements |
| isdn_dss1_dec | additional module for decoding dss1-specific element; |
| isdn_dss1_enc | additional module for encoding dss1-specific element; |
| isdn_s2_dec | additional module for decoding s2-specific elements |
| isdn_s2_enc | additional module for encoding s2-specific elements |
| ISDN_X_dec | additional module for decoding future X-specific elements |
| ISDN_X_enc | additional module for encoding future X-specific elements |

Figure 2:
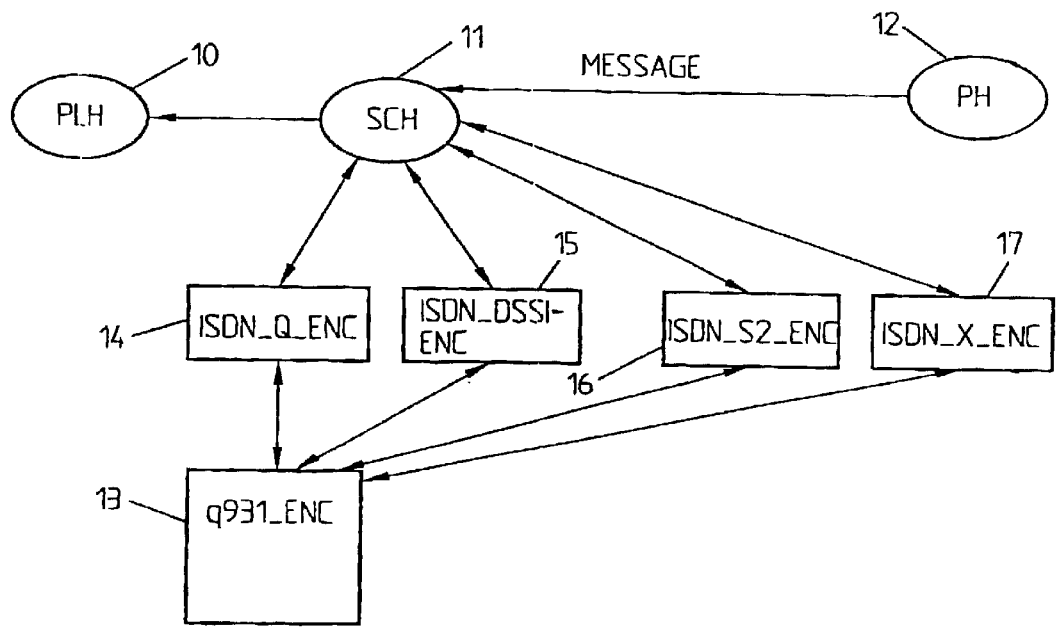
FIGS. 2–3 illustrates the process of encoding and decoding, respectively, in accordance with the invention.

FIG. 2 illustrates the process of encoding a message in accordance with the invention. A message is being sent to the Physical Link Handler 10 via the Signal Channel Handler 11 from the Protocol Handler 12. The protocol software is separated into a generic module 13 containing generic ISDN encoding protocols and into protocol specific modules 14–17 each containing a specific type of ISDN encoding protocol.

The protocol specific modules 14–17 contains the following information:

A declaration what messages to support.

A declaration what info-elements to be included in each message.

A table to inform what module to call for encoding of an information-element.

The generic module 13 contains routines for encoding elements according to CCITT q931.

The active protocol specific module 14–17 defines what messages to encode and starts a loop to call the generic module for each information element according to its own declaration table. The active protocol specific module assembles all results and sends the result (a list of bytes) to the hardware via PLH 10.

Figure 3:
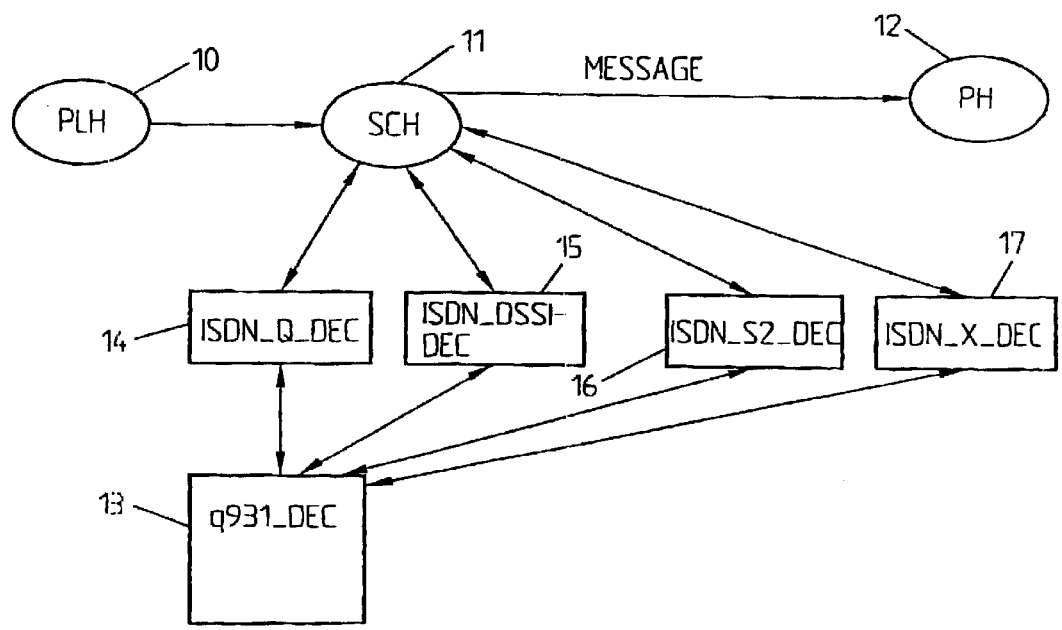

FIG. 3 illustrates the process of decoding a message in accordance with the invention. A message is being sent to the Protocol Handler 12 via the Signal Channel Handler 11 from the Physical Link Handler 10. The protocol software is separated into a generic module 13 containing generic ISDN decoding protocols and into protocol specific modules 14–17 each containing a specific type of ISDN decoding protocol.

The protocol specific modules 14–17 contains the following information:

A declaration what messages to support.

A table to inform what module to call for encoding of an information-element.

The generic module 13 contains routines for decoding elements according to CCITT q931.

The active protocol specific module 14–17 defines what messages to decode and starts a loop to call the generic module for each information element according to its own declaration table. The active protocol specific module assembles all results and sends the result to PH 12.

Figure 4:
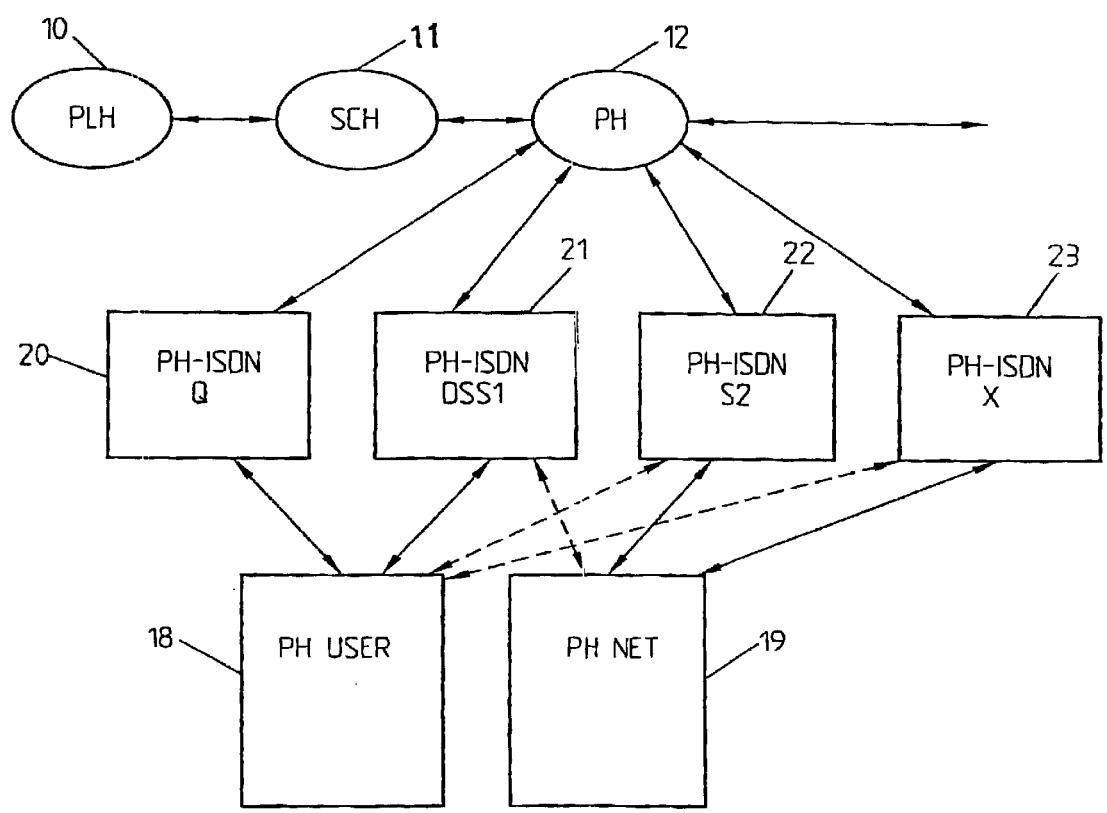
FIG. 4 illustrates the software structure of the Protoccol Handler.

The Protocol Handler 12 (see FIG. 4) is an entity supporting a call. This entity houses the state machine and all other Layer 3 is functions for a call. The software for PH is structured as follows:

One module 18 covering basic call as an user side, PH-user

One module 19 covering basic call as a net side, PH-net.

These two modules covers functions for basic call according to CCITT q931. For each type of ISDN there is a module 20–23 to take care of additional/alterations compared with CCITT q931.

When a message is received in PH (message from net or message from telephony system), the module for current type of isdn is called (e.g. PH.-ISDN DSS1). Normally a routine is called in PH USER (or PH NET) to take care of function. If a function is specific for current isdn-type and thus not covered in PH USER (PH NET), this is taken care of within the isdn-specific module and then completion can be done in e.g. PH USER module. Thus, PH-ISDN DSS1, S2 or X could either act as user or network.

The invention is not limited to the above described embodiment, but several modifications are possible within the scope of the accompanying claims without departing from the inventive concept.

What is claimed is:

1. A method for setting up a connection between a first terminal and a second terminal over an Integrated Services Digital Network (ISDN) link having one or more bearer channels that allow a user-selected protocol, the terminals supporting a plurality of possible software protocols for use on said bearer channels, the method comprising:

separating the protocol software into a generic module containing generic ISDN encoding/decoding protocols and into protocol specific modules containing specific types of ISDN encoding/decoding protocols;

providing a protocol handler having a user side module and a net side module for supporting basic calls between the first and second terminals;

checking if all information elements in a time slot have been received and that the received elements are not distorted; and sending a message to the protocol handler regarding set up information together with error information.

2. The method according to claim 1, further comprising the step of setting up the connection using an application resource system comprising a physical link handler for handling messages to and from related hardware, a signal channel handler for interfacing with protocol drivers, and the protocol handler.

3. The method according to claim 1, further comprising the step of providing the protocol handler PH with additional modules for supporting ISDN-specific calls.

4. The method according to claim 2, further comprising the step of the signal channel handler calling different ISDN modules needed during an encoding/decoding procedure.

5. The method according to claim 4, further comprising the steps of:

providing the signal channel handler with the generic module and the protocol specific modules; and storing the ISDN protocol being used during configuration of the system in the signal channel handler.

6. An application resource system for setting up a connection between a first terminal and a second terminal over an Integrated Services Digital Network (ISDN) line having one or more bearer channels that allow a user-selected protocol, the terminals supporting a plurality of possible software protocols for use in said bearer channels, the system comprising:
- a signal channel handler for interfacing with protocol drivers and being provided with a software structure which separates the protocol software into:
  - a generic module for encoding/decoding information elements, wherein the generic module contains generic ISDN encoding/decoding protocols and,
  - a plurality of protocol specific modules containing
    - a first declaration defining supported message types,
    - a second declaration defining information elements to be included in each message type,
    - a table correlating a module to call to the encoding/decoding information element,
  - wherein the first declaration, the second declaration, and the table are used by the generic module to encode/decode the respective information element; and
- a protocol handler including a state machine provided with software that is structured in a user side module supporting basic calls at a user side,
- a net side module supporting basic calls at a net side, and
- at least one additional module for each respective ISDN protocol.

7. The application resource system according to claim 6, further comprising a physical link handler for handling messages to and from related hardware and the protocol handler.

* * * * *